United States Patent
Engelhardt et al.

(12) 
(10) Patent No.: US 6,311,574 B1
(45) Date of Patent: Nov. 6, 2001

(54) DEVICE FOR FINE POSITIONING OF A COMPONENT

(75) Inventors: Johann Engelhardt, Bad Schönborn; Klaus Kierschke, Schriesheim, both of (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/472,255

(22) Filed: Dec. 27, 1999

(30) Foreign Application Priority Data

May 28, 1999 (DE) ................................ 199 24 709

(51) Int. Cl.$^7$ ................................ F16H 35/18
(52) U.S. Cl. ................................ 74/10.7; 359/554
(58) Field of Search .................... 74/10.7, 10.9; 359/554, 433, 643

(56) References Cited

U.S. PATENT DOCUMENTS 3,407,018 * 10/1968 Miller ................................ 350/321
4,688,908 * 8/1987 Moore ................................ 350/531
6,137,627 * 10/2000 Engelhardt et al. ................ 359/393

FOREIGN PATENT DOCUMENTS

WO 98/08126 * 2/1998 (WO).

* cited by examiner

*Primary Examiner*—David Fenstermacher
(74) *Attorney, Agent, or Firm*—Simpson, Simpson & Snyder, PLLC

(57) ABSTRACT

A device for fine positioning of a component (1), especially for vertical fine positioning of an objective or revolving objective nosepiece (1) of a microscope, with a lever system (3) and a drive (4) for the lever system, is characterized in that the lever system (3) acts directly on a rotating part (5); that the component (1) is flexibly connected to the rotating part (5); and that the connection (6) acts such that rotation of the rotating part (5) changes the position of component (1) by unrolling the flexible connection (6) on the rotating part (5), thus causing a lifting movement of the component (1).

34 Claims, 3 Drawing Sheets

DEVICE FOR FINE POSITIONING OF A COMPONENT

BACKGROUND OF THE INVENTION

A. Field of the Invention

The invention concerns a device for fine positioning of a component, especially for vertical fine positioning of an objective or a revolving objective nosepiece in microscopy, with a lever system and a drive for the lever system.

The device being discussed here is, very generally, a device for fine positioning of a component. This component can be, for example, a fine-focusing stage for microscopes. Here, in particular, it is a device for vertical fine positioning of an objective or a revolving objective nosepiece, but the teaching claimed here is not limited to that specific application.

B. Description of the Prior Art

A galvanometer lifting table is already known in practice, but that has a tilting rather than a parallel lifting movement. Such a galvanometer lifting table is in any case not suitable for positioning if a parallel lift is required without a tilt error.

A fine focusing stage is known from German Patent 196 50 392 A1. In that patent, the component to be raised or lowered is designed as an object plate. Because of stiffness, the known fine focusing stage is not suitable for fine positioning of an objective or a revolving objective nosepiece. In addition to that, the known fine focusing stage is extremely limited with respect to its maximum travel.

If one wishes to finely position an objective or a revolving objective nosepiece of a microscope, parallel lifting movement is absolutely necessary because of the optical requirements. This lifting movement must be obtained with extremely accurate relative axial positioning, which should be better than 20 nm. Such accuracy is not attainable in any case for ordinary drive designs.

In many applications in microscopy, work is done directly on the object being examined. For instance, work can be done on the object by externally mounted micromanipulators during observation. Focusing of the object stage would be accompanied by undesirable relative movement between the object and the micromanipulators, and that would substantially increase the cost of the equipment. Thus it is desirable, in such applications, for the focusing to be accomplished on the objective or revolving objective nosepiece with the object stage stationary. That must be accomplished with a device of the type stated initially, with the lifting means having the desired accuracy with respect to the axial relative positioning.

SUMMARY OF THE INVENTION

This invention is based on the objective of designing and developing a device for fine positioning of a component, especially for vertical fine positioning of an objective or a revolving objective nosepiece of the type mentioned initially so that tilt-free elevation of the component being positioned is possible with simple means.

The device according to the invention for fine positioning of a component attains the above objective by the fact that a lever system acts directly on a rotating part; that the component is flexibly linked with the rotating part; and that a linkage changes the relative position of the component by rolling a flexible strip onto the rotating part, so that lifting a mount for the component produces a lifting movement of the component.

It is known, according to the invention, that a tilt-free lifting movement of the component being positioned can be attained by providing, along with the lever system and a drive for the lever system, a rotating part which is rotated immediately above the lever system. In other words, at least one lever is linked to the rotating part such that a tilting of the lever causes rotation of the rotating part. The component being positioned is, in turn, linked with the rotating part, this linkage being not rigid but flexible. The linkage between the component and the rotating part acts as a very special mount for the component, so that as the rotating part rotates, the position of the component is relatively changed by rolling of the flexible strip on the rotating part, depending on the direction of rotation. Because of this change of position between the rotating part and the component, and because of the mounting of the component, a change of the position leads to an immediate lifting movement of the component, without play and largely without friction.

Now it is fundamentally possible to achieve the features stated above by adding to an ordinary guide. Instead of an ordinary guide, the component can be mounted solely by means of the flexible linkage, so that no more extensive guiding is required.

The linkage between the rotating part and the component is very advantageously accomplished as a preferably flexible strip which is wound at least partially around the rotating part, with its free end firmly linked to the component. Finally, the strip can be springy so that it serves both as a mount for the component and also to accomplish the fine lifting or fine positioning. As the rotating part rotates, its position changes in relation to the component, so that the component is raised or lowered vertically with respect to the rotating part or to a frame or housing.

In a specific case, the strip extends like a loop around the rotating part, so that on rotation of the rotating part the position of the loop moves along the length of the strip so that the position between the loop or the rotating part and the component varies, depending on the direction of rotation of the rotating part. In one such embodiment the loop is not wound onto the rotating part. Instead, the position of the loop is changed, causing a lift of the component on realization of the arrangement specified above.

The loop in the strip being discussed here, extending around the rotating part, is produced advantageously by sticking a narrow region of the strip through a longitudinal cutout in the strip, so that the loop can be moved along the cutout by rotation of the rotating part. Slippage between the strip or the loop in the strip and the rotating part must be avoided. That can be done by fastening the strip, at least at a point, to the rotating part. Adhesion between the strip and the rotating part due to increased frictional coefficient is sufficient.

The mounting produced here can be modified by preloading the strip with a spring in any position of the component between the component and the rotating part. That provides high stability of the position of the component. The strip itself can be made of plastic or of spring steel. Spring steel is particularly useful.

To accomplish an arrangement of the parts which is tilt-free at any stage of lifting, the component is linked with the rotating part through at least two of the strips mentioned above. In that case the rotating part can be designed as a shaft extending parallel to the component. Tilt error is also avoided by placing one rotating part at each side of the component. An additional guide is not required. To that extent the component can hang properly between the rotated parts, and it has a stable position at any stage of lifting because of the preloading of the strips.

In a further advantageous manner, the component is placed within a framework or even within a housing, so that the overall height is small because of the features described above. The rotating part or parts would then extend between opposite sides of the frame or the walls. The rotating parts are mounted in bearings, in a further advantageous manner, in the frame sides or walls. Thus the rotating part could be rotated by the lever system within the frame or housing.

In one particularly advantageous embodiment, the rotating part extends through at least one of the frame sides or through at least one of the walls to the outside. If two rotating parts are provided, this measure need be applied to only one of them. The lever system is then linked to the part of the rotating part that extends out, so that the actuation is done outside the frame or housing.

To the extent that a rotating part is provided at both sides of the component, the rotation of the rotating parts must be synchronized to get exactly parallel lift. That can be accomplished by direct synchronization between the rotating parts. In a very particularly advantageous manner, the lever system comprises at least one positioning lever solidly linked to the rotating part and an actuating lever solidly linked to the positioning lever, such that the actuating lever can be tilted by the drive. Now a positioning lever must be solidly fastened to each of the two rotating parts to synchronize the rotational movement of the rotating parts. Instead of direct synchronization of the rotating parts, the two positioning levers are flexibly linked together at the far ends of the rotating parts. This flexible linkage may involve strips having the characteristics of the linkage between the component and the rotating part. The indirect synchronization thus achieved has the advantage that only one rotating part must be rotated from outside, through the positioning lever firmly linked to the rotating part. This positioning lever acts on the opposite rotating part through another positioning lever, with the previously mentioned flexible connection between the two positioning levers. This flexible connection makes it possible for the two positioning levers to tilt with respect to each other and also provides at least a slight relative motion between the positioning levers, so that fine positioning of the component is possible without other action.

As already noted above, the actuating lever acts to connect the positioning lever, and thus the rotating part, to the drive. In this way the actuating lever, with its end away from the positioning lever, can be moved along a rotated spindle so that tilting of the actuating lever results in tilting of the positioning lever and, in turn, rotation of the rotating part or parts. The actuating lever is also flexibly linked to a positioning part running on the spindle, so that with this flexible linkage there can also be a strip with the features of the linkage between the component and the rotating part. Also, to this extent, the actuating lever can be tilted relative to the rotating part and thus with respect to the spindle. The spindle itself is driven by an electric motor which, in turn, can be flexibly or elastically mounted. This has the advantage that a lateral shift of the motor axis or of the spindle, in the sense of an imbalance, for instance, is compensated by the flexible motor mount, so that this deviation is not transmitted to the lever system and not at all to the rotating part or the component.

If the motor has a high gear ratio, e. g., 2000 steps per rotation, combined with a small spindle slope, and with appropriately designed lever arms for the actuating and positioning levers, one achieves high resolution for the positioning accuracy of the component over a large path, that is, for instance, less than 20 nm relative.

BRIEF DESCRIPTION OF THE DRAWINGS

Now there are various possibilities for embodying and developing the teaching of this invention. The generally preferred embodiments and developments of the teaching are explained in connection with the explanation of a preferred example embodiment of the invention by means of the drawing. The drawing shows.

DETAILED DESCRIPTION OF THE PREFERRED EMBODIMENTS

Figure 1:
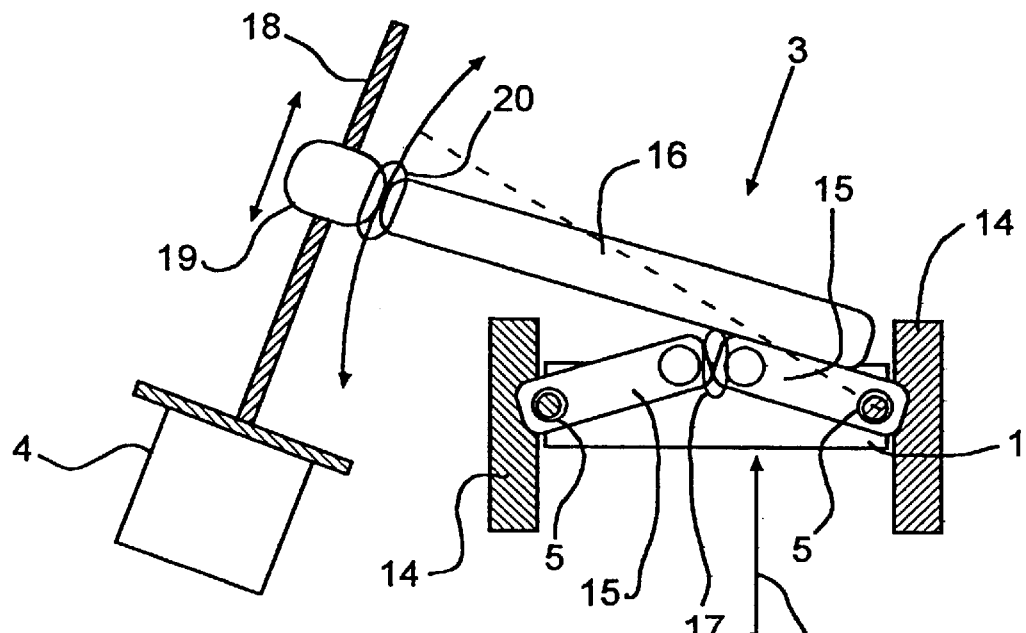
FIG. 1 is a schematic side view of a device for fine focusing of a component formed in accordance with a preferred embodiment of the present invention.
Figure 2:
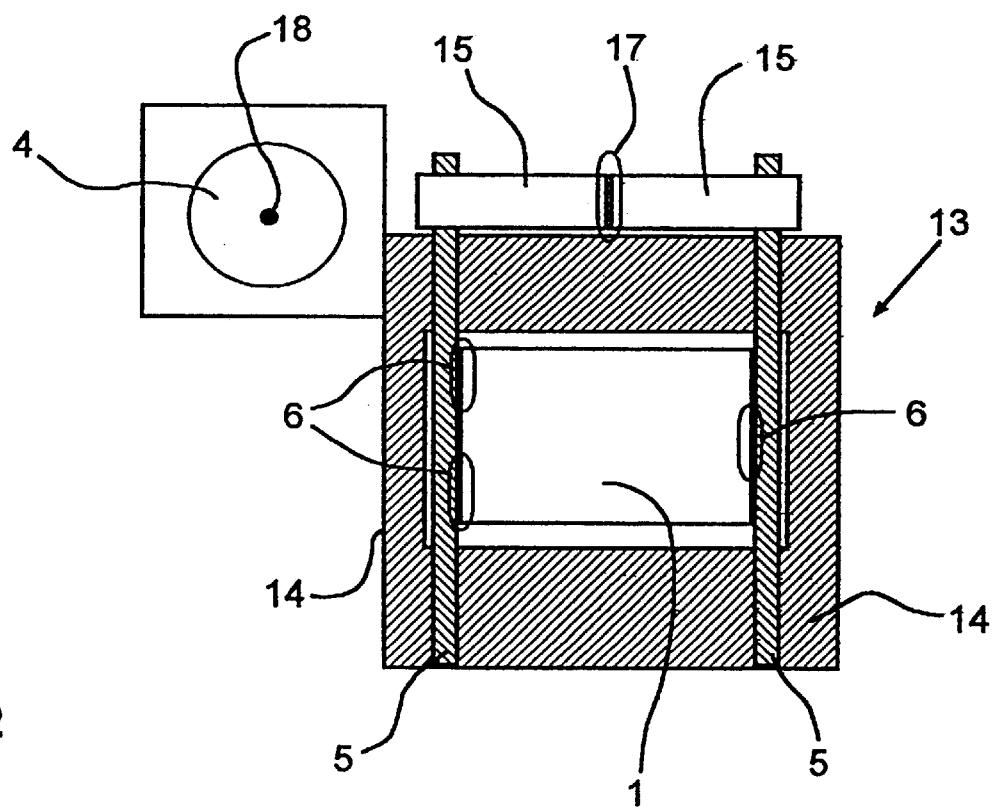
FIG. 2 is a schematic plan view of the device shown in FIG. 1.

FIGS. 1 and 2 together show a device for fine positioning of a component 1, with component 1 shown only schematically. It can, for instance, be a microscope objective or revolving objective nosepiece. Component 1 can be positioned vertically, i. e., in the z direction, indicated by the reference number 2. The device comprises a lever system 3 and a drive 4 for the lever system 3.

According to the invention the lever system 3 acts directly on a rotating part 5, with component 1 being linked flexibly to rotating part 5. This flexible link 6 is designed so that rotation of the rotating part 5 changes the position of component 1 by unrolling the flexible linkage 6 on the rotating part, thus raising the mount for component 1 and so raising component 1.

Figure 3:
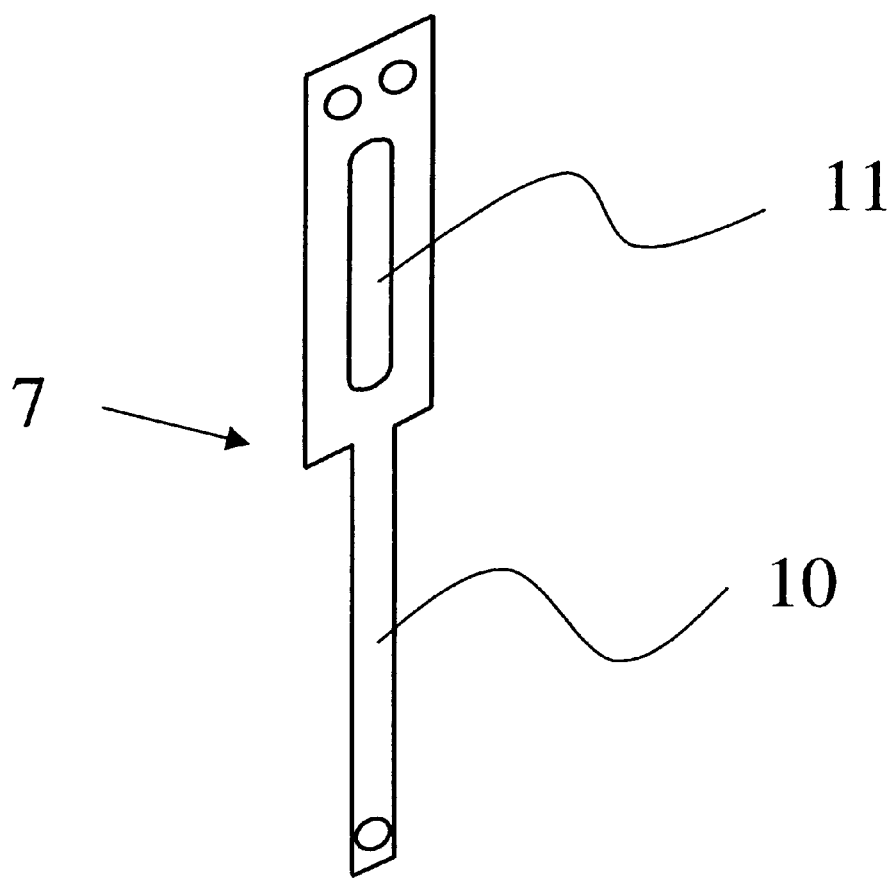
FIG. 3 is a perspective view of a strip acting as an elastic connection in the device shown in FIG. 1, in an unrolled state.
Figure 4:
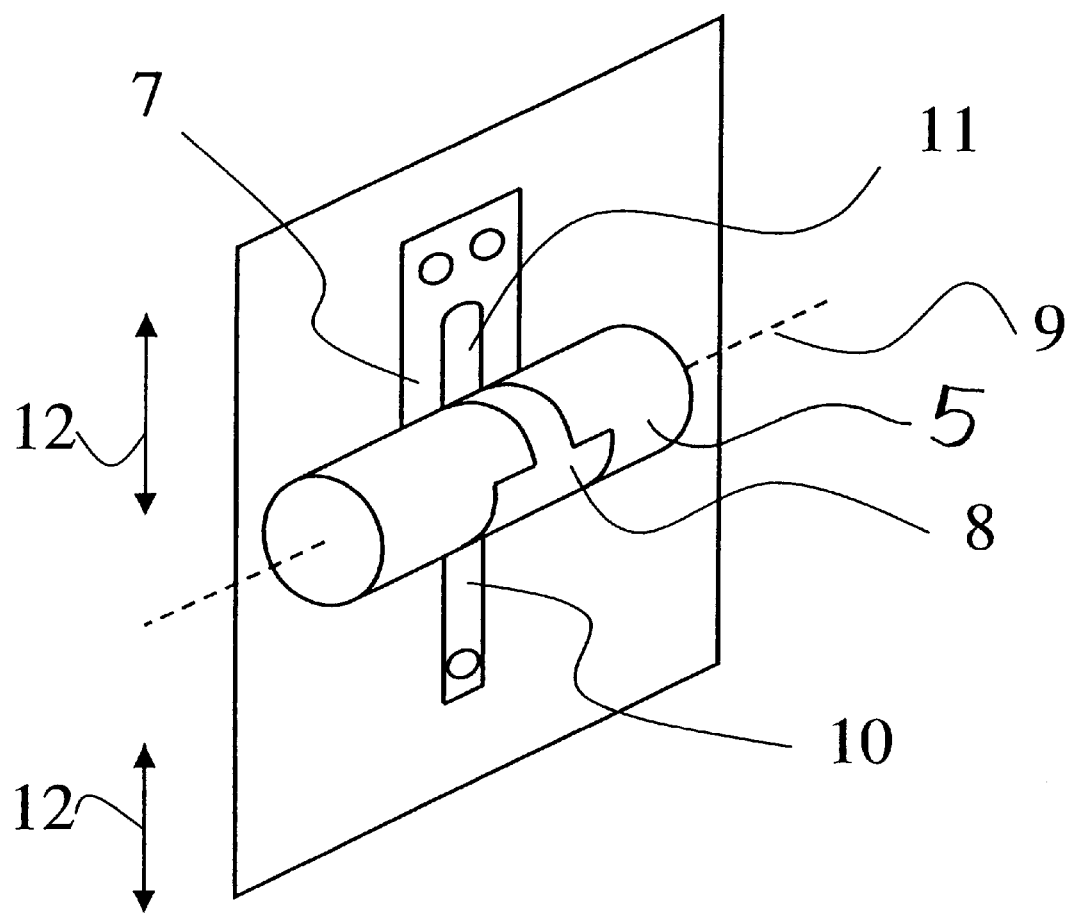
FIG. 4 is a perspective view of the strip shown in FIG. 3, in an operating loop state.

The actual flexible link 6 is a flexible strip 7 wound around rotating part 5 with its free end firmly connected to component 1, as is shown, for instance, in FIGS. 3 and 4. This strip 7 extends around the rotating part 5 like a loop, so that when the rotating part 5 is rotated the position of the loop 8 moves along the length of strip 7, so that the position changes between the loop 8 or the rotating part and the component 1, depending on the direction of rotation of the rotating part 5. When the axis of rotation 9 of the rotating part 5 is fixed in position, the component 1 is moved up or down in direction 2. Thus a lifting movement of component 1 is defined.

FIGS. 3 and 4 show particularly clearly that the loop 8 around rotating part 5 is formed by a narrowed section 10 of strip 7 extending through a longitudinal cutout 11 of strip 7, so that the loop 8 can be moved along the cutout 11. Arrow 12 in FIG. 4 indicates that with the axis of rotation 9 of the rotating part 5 fixed in position, the portions of strip 7 in front of and behind loop 8 move, so that the lifting movement is finally accomplished. In the example embodiment selected here, strip 7 is made of metal.

With respect to an actual embodiment of the device according to the invention, FIGS. 1 and 2 show clearly that component 1 is connected with the rotating part 5 through one flexible connection 6 or strip 7 on one side and through two flexible connections 6 or strips 7 on the other side. That effectively avoids any tilt error.

The rotating part 5 is designed as a shaft extending parallel to component 1, with one rotating part 5 for each side of component 1.

FIGS. 1 and 2 also show that component 1 is placed within a frame 13. The rotating parts 5 extend between two opposite sides 14 of the frame 13, with the rotating parts 5 mounted in bearings in the frame sides 14.

FIG. 2 shows particularly clearly that the two rotating parts 5 extend through frame side 14 to the outside on one side. Outside the frame 13, the lever system 3 grips the rotating parts 5, each with one positioning lever 15, with one of the two positioning levers 15 is solidly connected to an actuating lever 16 to rotate one of the two rotating parts 5. This actuating lever 16 can in turn be tilted by drive 4.

The figures also show that a positioning lever 15 is solidly connected to each of the two rotating parts 5. The two positioning levers 15 are flexibly connected together at the ends away from the rotating part 5. This elastic connection 17 again involves strips 7 with the characteristics of the elastic connection 6 between component 1 and the rotating part 5.

FIG. 1 further shows that the end of actuating lever 16 away from positioning lever 15 can be moved along a spindle 18 which is driven to rotate, with the actuating lever 16 elastically linked to the positioning part 19 which runs on the spindle 18. This elastic connection 20 can, in turn, involve a strip 7 with the characteristics of the elastic connection 6 between the component 1 and the rotating part 5. To avoid repetitions, see the general section of the description with respect to other features not shown in the figures.

What is claimed is:

1. A device for fine positioning of a component comprising:
   a rotating part mounted for rotation about a fixed axis;
   a flexible element for connecting said component to said rotating part;
   drive means; and
   a lever system for operably linking said drive means to said rotating part to rotate said part about said axis;
   whereby the position of said component is changed when said flexible element is rolled and unrolled along said rotating part as said rotating part rotates about said axis.

2. The device according to claim 1, wherein said flexible element is a flexible strip at least partially wound around said rotating part and having a free end fixedly connected to said component.

3. The device according to claim 2, wherein said strip extends in the form of a loop around said rotating part to frictionally engage said rotating part such that rotation of said rotating part about said axis moves the position of said loop along the length of said strip in opposite directions depending upon the direction of rotation of said rotating part.

4. The device according to claim 3, wherein said strip includes a narrowed region and an elongated cutout region extending in a longitudinal direction of said strip, and said loop is formed by extending said narrowed region through said cutout region so that said loop can be moved along said elongated cutout region.

5. The device according to claim 2, wherein said strip is preloaded by a spring in any position of the component between the component and the rotating part.

6. The device according to claim 2, wherein said strip is made of plastic.

7. The device according to claim 2, wherein said strip is made of metal.

8. The device according to claim 2, wherein said component is connected to said rotating part by at least two of said strips.

9. The device according to claim 1, wherein said rotating part comprises an elongated shaft extending parallel to said component.

10. The device according to claim, 1, wherein there are a pair of said rotating parts placed one at each opposite side of said component.

11. The device according to claim 10, further comprising a frame surrounding said component.

12. The device according to claim 11, wherein each of said pair of rotating parts is supported by said frame.

13. The device according to claim 12, wherein said frame includes bearings for rotatably supporting each of said pair of rotating parts.

14. The device according to claim 12, wherein each of said pair of rotating parts extends outward from said frame.

15. The device according to claim 14, wherein said lever system is linked to each of said pair of rotating parts externally of said frame.

16. The device according to claim 10, wherein said lever system includes a pair of positioning levers fixed one to each of said pair of rotating parts, and said pair of positioning levers are flexibly joined at ends thereof remote from said pair of rotating parts.

17. The device according to claim 16, wherein said lever system includes an actuating lever fixed to one of said pair of positioning levers, and said actuating lever is tilted by said drive means.

18. The device according to claim 17, wherein said drive means includes a driven spindle, and an end of said actuating lever remote from said one of said pair of positioning levers is connected for travel along said spindle as said spindle rotates.

19. The device according to claim 18, wherein said end of said actuating lever is flexibly connected to a positioning part mounted for travel along said spindle.

20. The device according to claim 19, wherein said end of said actuating lever is connected to said positioning part by a flexible strip.

21. The device according to claim 16, wherein said pair of positioning levers are joined by a flexible strip.

22. The device according to claim 1, further comprising a frame surrounding said component.

23. The device according to claim 22, wherein said rotating part is supported by said frame.

24. The device according to claim 23, wherein said frame includes bearings for rotatably supporting said rotating part.

25. The device according to claim 23, wherein said rotating part extends outward from said frame.

26. The device according to claim 25, wherein said lever system is linked to said rotating part externally of said frame.

27. The device according to claim 1, wherein said lever system includes a positioning lever fixed to said rotating part and an actuating lever fixed to said positioning lever, and said actuating lever is tilted by said drive means.

28. The device according to claim 27, wherein said drive means includes a driven spindle, and an end of said actuating lever remote from said positioning lever is connected for travel along said spindle as said spindle rotates.

29. The device according to claim 28, wherein said end of said actuating lever is flexibly connected to a positioning part mounted for travel along said spindle.

30. The device according to claim 29, wherein said end of said actuating lever is connected to said positioning part by a flexible strip.

31. A device for fine positioning of a component comprising:
   a rotating part mounted for rotation about a fixed axis;
   a first flexible strip rolled at least partially around said rotating part for connecting said component to said rotating part;

drive means including a driven spindle and a positioning part mounted for travel along said spindle; and a lever system for operably linking said drive means to said rotating part to rotate said rotating part about said axis, said lever system including a positioning lever fixed to said rotating part and an actuating lever fixed to said positioning lever; and a second flexible strip for connecting said an end of said actuating lever remote from said positioning lever to said positioning part such that said actuating lever is tilted by said drive means.

32. The device according to claim 31, wherein said first flexible strip and said second flexible strip each include a narrowed region and an elongated cutout region extending in a longitudinal direction of said strip, and a loop is formed by extending said narrowed region through said cutout region such that said loop can be moved along said elongated cutout region.

33. A device for fine positioning of a component comprising:

a pair of rotating parts mounted for rotation about respective fixed axes on opposite sides of said component;

a first flexible strip rolled at least partially around each of said pair of rotating parts for connecting said component to said pair of rotating parts;

drive means including a driven spindle and a positioning part mounted for travel along said spindle; and a lever system for operably linking said drive means to said pair of rotating parts to rotate said pair of rotating parts about their respective axes, said lever system including a pair of positioning levers fixed one to each of said pair of rotating parts and an actuating lever fixed to one of said pair of positioning levers;

a second flexible strip for connecting said an end of said actuating lever remote from said positioning lever to said positioning part such that said actuating lever is tilted by said drive means; and a third flexible strip for joining said pair of positioning levers at ends thereof remote from said pair of rotating parts.

34. The device according to claim 33, wherein said first flexible strip, said second flexible strip, and said third flexible strip each include a narrowed region and an elongated cutout region extending in a longitudinal direction of said strip, and a loop is formed by extending said narrowed region through said cutout region such that said loop can be moved along said elongated cutout region.

* * * * *